United States Patent
Furuuchi

(10) Patent No.: US 7,438,176 B2
(45) Date of Patent: Oct. 21, 2008

(54) STRETCHABLE TRANSFER CONVEYER METHOD OF STRETCHING TRANSFER CONVEYER AND STRETCHABLE GUIDE DEVICE FOR MOVABLE ARTICLE

(75) Inventor: Mikio Furuuchi, Chiryua (JP)

(73) Assignee: Fuji Machine Mfg. Co., Ltd., Chiryu-shi (JP)

( * ) Notice: Subject to any disclaimer, the term of this patent is extended or adjusted under 35 U.S.C. 154(b) by 57 days.

(21) Appl. No.: 10/552,576

(22) PCT Filed: Apr. 30, 2004

(86) PCT No.: PCT/JP2004/006293

§ 371 (c)(1),
(2), (4) Date: Oct. 12, 2005

(87) PCT Pub. No.: WO2004/096674

PCT Pub. Date: Nov. 11, 2004

(65) Prior Publication Data

US 2006/0237288 A1 Oct. 26, 2006

(30) Foreign Application Priority Data

Apr. 30, 2003 (JP) ............................. 2003-125459

(51) Int. Cl.
*B65G 21/20* (2006.01)
(52) U.S. Cl. .................... 198/347.1; 198/594; 198/595; 198/817; 198/812; 198/814
(58) Field of Classification Search ................. 198/594, 198/595, 812, 814, 817, 347.1
See application file for complete search history.

(56) References Cited

U.S. PATENT DOCUMENTS

| 3,352,406 | A | * | 11/1967 | Long | ........................... | 198/812 |
| 3,355,007 | A | * | 11/1967 | Middlesworth | ............. | 198/812 |
| 6,012,568 | A | * | 1/2000 | Kane | ........................ | 198/817 |
| 6,629,595 | B2 | * | 10/2003 | Wiese et al. | ................. | 198/817 |

FOREIGN PATENT DOCUMENTS

| JP | 6-255762 | 9/1994 |
| JP | 2000-142944 | 5/2000 |

* cited by examiner

*Primary Examiner*—Gene O. Crawford
*Assistant Examiner*—Kavel P Singh
(74) *Attorney, Agent, or Firm*—Oblon, Spivak, McClelland, Maier & Neustadt, P.C.

(57) ABSTRACT

In a transfer conveyer wherein a pair of guide rails respectively provided with guide surfaces for guiding both side surfaces of a transferred article in a transfer direction are extended in the transfer direction and wherein flexible endless belts are provided for supporting lower surfaces at both sides of the transferred article, whose both side surfaces are guided on the guide surfaces, to transfer the transferred article in the transfer direction, a stretching mechanism is provided on one end portion of each guide rail to be stretchable in the transfer direction, a stretchable guide surface for defining a flat surface continuous and even with the guide surface regardless of any stretched position is formed at a facing surface of each stretching mechanism, and plural pulleys for circulatably supporting a part of the endless belt are provided on the facing surface of the stretching mechanism. Thus, the guide surfaces for guiding each side surface of the transferred article are formed continuously even when the end portion of the guide rail is stretched by the stretching mechanism.

7 Claims, 6 Drawing Sheets

STRETCHABLE TRANSFER CONVEYER METHOD OF STRETCHING TRANSFER CONVEYER AND STRETCHABLE GUIDE DEVICE FOR MOVABLE ARTICLE

TECHNOLOGICAL FIELD

The present invention relates to a transfer conveyer for transferring transferred articles such as printed boards or the like with endless belts such as transfer belts or the like.

BACKGROUND ART

Heretofore, there has been known a transfer conveyer in which a pair of guide rails respectively provided with guide surfaces for guiding both side surfaces of a transferred article in a transfer direction are extended in the transfer direction and in which plural pulleys are provided for circulatably supporting endless belts, which support both side lower surfaces of the transferred article, to transfer the same in the transfer direction. In an electronic component mounding apparatus or the like with such a transfer conveyer, since plural transfer conveyers are juxtaposed with the space between two adjoining transfer conveyers being set to several millimeters, care must be taken so that apparatus are not brought into contact or collision with each other when installed or displaced for new building, the layout change or the like of the facilities, and this results in making the work troublesome and taking a long time. Another conveyer has also been known, in which in order to solve this problem, end portions of the guide rails are made stretchable to be adapted easily for the displacement of the apparatus. For example, Japanese unexamined, published patent application 2000-142944 describes a stretchable transfer conveyer, in which a channeled portion is formed at an end portion of each of guide rails while another channeled portion complementarily insertable thereinto is formed at a mating end portion of each of adjuster guide rails and in which each adjuster guide rail is joined with the end portion of each guide rail to be positionally adjustable within an area in which both of the channeled portions are fitted in each other, so that protrusion portions of either one of the channeled portions insertable mutually exist to function as guides for guiding the either side of the transferred article.

However, in the stretchable transfer conveyer described in the Japanese unexamined, published patent application 2000-142944, although the protrusions of either one of the channeled portions each fitted into the other resides in the transfer direction in the stretched state, clearances are made between the protrusions and the channels to bring about discontinuity, and steps are made between the ends of the protrusions of one of the guide rail and the adjuster guide rail and the ends of the protrusions of the other guide rail. Thus, a problem arises in that the transferred article cannot be guided smoothly. Further, in the case of a transferred article thin in thickness like printed board or the like, it has been difficult to provide the channeled portions at respective ends of the guide rail and the adjuster guide rail within the thickness of the thin transferred article.

In particular, where printed boards are to be transferred, the clearance between each side surface of the printed board and a guide surface therefore is set to a range of 0.5 to 1 mm, and thus, it is necessary that each guide surface be continuous and smooth over the entire length of the transfer conveyer. Since the printed board before reflow processing holds electronic components by means of the viscosity only of soldering paste, such printed board has to be transferred smoothly without suffering any shock. However, the prior art stretchable transfer conveyer constitutes discontinuous guide surfaces and thus, is unsuitable for use in transferring such printed boards.

The present invention is made to solve the problems involved in the prior art and provides a stretchable transfer conveyer and a method of stretching a transfer conveyer wherein guide surfaces for guiding side surfaces of a transferred article can be formed as continuous and even flat surfaces even where an end portion of each guide rail is stretched by a stretching mechanism.

DISCLOSURE OF THE INVENTION

In order to solve the aforementioned problems and in order to attain its object, the present invention in a first aspect provides a stretchable transfer conveyer wherein a pair of guide rails respectively provided with guide surfaces for guiding both side surfaces of a transferred article in a transfer direction are extended in the transfer direction and wherein flexible endless belts for supporting lower surfaces at both sides of the transferred article, whose both side surfaces are guided along the guide surfaces, to transfer the transferred article in the transfer direction are drivingly connected to a drive device and are carried along plural rotational members to be circulated. The conveyor includes a stretching mechanism provided at one end of each of the guide rails to be stretchable in the transfer direction; a stretchable guide surface provided at a facing surface of the stretching mechanism and formed into a flat surface continuous and even with the guide surface regardless of the stretched position of the stretching mechanism; and plural rotational members provided on the facing surface of the stretching mechanism for circulatably supporting the endless belt.

With this construction, since the layout and the displacement of apparatus can be done with the space from guide rails next thereto or the like being widened by contracting the stretching mechanism provided on the end of each guide rail, the danger of contact or collision with any adjoining apparatus is minimized, so that work becomes easier to shorten work time. Then, the space between the adjoining transfer conveyers can be adjusted to several millimeter wide by stretching the stretching mechanism in the state that the layout of plural apparatus is completed. At this time, since the stretchable guide surface being a flat surface continuous and even with the guide surface is formed at the facing surface of each stretching mechanism regardless of any stretched position of each stretching mechanism, the transferred article transferred by the endless belts can be guided smoothly at each of the both side surfaces thereof along the guide surface and the stretchable guide surface.

Further, according to the present invention in a second aspect, in the stretchable transfer conveyer improved as aforementioned in the first aspect, the stretching mechanism comprises an adjuster member mounted on an end of each guide rail to be movable in the transfer direction and provided with an adjuster guide surface being a flat surface even with the guide surface; and a complementary member insertable into a space which is made between the guide surface of the guide rail and the adjuster guide surface of the adjuster member when the adjuster member is moved in the transfer direction and provided with a complementary guide surface for forming the stretchable guide surface together with the adjuster guide surface.

With this construction, when the adjuster member mounted on the end portion of each guide rail is adjusted with respect to its position in the transfer direction, the complementary member is inserted into the space made between the guide surface of each guide rail and the adjuster guide surface of the adjuster member, whereby the complementary guide surface formed on the complementary member and the adjuster guide surface form the stretchable guide surface which is a flat surface continuous and even with the guide surface. Thus, in addition to the aforementioned effects of the invention in the first aspect, it is possible to provide the stretchable transfer conveyer simplified in construction and low in cost.

Further, according to the present invention in a third aspect, in the stretchable transfer conveyer improved as aforementioned in the second aspect, the complementary member is mounted on the end of the guide rail to be movable in a complementary direction intersecting with the transfer direction with the complementary guide surface defining a flat surface continuous and even with the guide surface; and the adjuster member and the complementary member are joined at respective joint surfaces which are inclined relative to the transfer direction as well as to the complementary direction whereby the adjuster guide surface and the complementary guide surface are jointed along the respective joint surfaces to define the stretchable guide surface as a continuous and even flat surface.

With this construction, when the adjuster member mounted on the end portion of each guide rail is adjusted with respect to its position in the transfer direction, the complementary member mounted on the end portion of each guide rail is moved in the complementary direction, and the complementary guide surface formed on the complementary member is connected to the guide surface of the guide rail and the adjuster guide surface of the adjuster member through the flat surface even and continuous therewith. Thus, in addition to the aforementioned effects of the invention in the second aspect, it is possible in a simplified construction to make the smooth stretchable guide surface as the flat surface continuous and even with the guide surface of the guide rail.

According to the present invention in a fourth aspect, in the stretchable transfer conveyer improved as aforementioned in the third aspect, the adjuster member has mounted thereon a first rotational member for winding therearound one end of a horizontally traveling portion of the endless belt and a second rotational member for downwardly bending the endless belt run out from the first rotational member; the complementary member has mounted thereon a third rotational member for horizontally bending the endless belt run out from the second rotational member and a fourth rotational member for roughly vertically bending the endless belt bent horizontally; and the guide rail has mounted thereon a fifth rotational member for horizontally bending the endless belt run out from the fourth rotational member.

With this construction, when the adjuster member mounted on the end portion of each guide rail is adjusted with respect to its position in the transfer direction, the first and second rotational members mounted on the adjuster member and the third and fourth rotational members mounted on the complementary member are moved in dependence on the movement of the adjuster member. Thus, the endless belt can be supported to be circulated with the end portion being hardly slacked. Thus, it can be realized to minimize the slack or the like of the endless belt when the position adjustment is performed of the adjuster member.

According to the present invention in a fifth aspect, in the stretchable transfer conveyer improved as aforementioned in the fourth aspect, the complementary direction is a vertical direction perpendicular to the transfer direction; the adjuster member and the complementary member are joined at the joint surfaces which are inclined 45 degrees relative to the transfer direction; the adjuster guide surface and the complementary guide surface are joined along the joint surfaces to constitute the stretchable guide surface; the adjuster member has mounted thereon the first rotational member for winding therearound one end of the horizontally traveling portion of the endless belt and the second rotational member for downwardly bending the endless belt run out horizontally from the first rotational member; the complementary member has mounted thereon the third rotational member for horizontally bending the endless belt run out from the second rotational member and the fourth rotational member for roughly vertically bending the endless belt bent horizontally; the guide rail has mounted thereon the fifth rotational member for horizontally bending the endless belt run out from the fourth rotational member; and the third rotational member is moved as being restrained by a guide vertically provided on the adjuster member and another guide horizontally provided on the complementary member.

With this construction, when the adjuster member mounted on the end portion of each guide rail is adjusted with respect to its position in the transfer direction, the complementary member is moved by the same amount in the vertical direction, and the third rotational member is moved to cause portions of the endless belt running along the second to the fourth rotational members to extend vertically and horizontally regardless of any adjusted position of the adjuster member in the transfer direction. Thus, it is possible to prevent the endless belt from being slacked even upon the movement of the adjuster member.

According to the present invention in a sixth aspect, the stretchable transfer conveyers improved as aforementioned in the first aspect, further includes a feed device for moving the adjuster member in the transfer direction; and means for moving the complementary member in the complementary direction in linkage relation with the movement of the adjuster member.

With this construction, when the end portion of the guide rail is stretched or contracted as a result of adjusting the position of the adjuster member by the feed device, the complementary member is moved in linkage relation therewith to form the stretchable guide surface which is the flat surface continuous and even with the guide surface. Thus, it is possible to stretch or contract the transfer conveyer by a simplified manipulation. According to the present invention in a seventh aspect, in the stretchable transfer conveyers improved as aforementioned in the first aspect, the transferred article is a printed board or a board for mounting electronic components thereon.

With this construction, since the stretchable guide surface which is the flat surface continuous and even with the guide surface of each guide rail is formed at the facing surface of the stretching mechanism regardless of any stretched position of the stretching mechanism, it is possible to smoothly transfer the thin printed board or the thin board for mounting electronic components thereon.

In an eighth aspect the present invention provides a method of stretching a transfer conveyer wherein a pair of guide rails respectively provided with guide surfaces for guiding both side surfaces of a transferred article in a transfer direction are extended in the transfer direction and wherein flexible endless belts for supporting lower surfaces at both sides of the transferred article, whose both side surfaces are guided along the guide surfaces, to transfer the transferred article in the transfer direction are drivingly connected to a drive device and are carried along plural rotational members to be recirculated. The method includes mounting an adjuster member, which is provided with an adjuster guide surface being a flat surface even with the guide surface, on one end of each guide rail to be movable in the transfer direction; providing a complementary member, which is provided with a complementary guide surface being a flat surface even with the guide surface, to be movable in the complementary direction intersecting with the transfer direction with the guide surface and the complementary guide surface defining a continuous and even flat surface; and joining the adjuster member and the complementary member at respective joint surfaces which are inclined relative to the transfer direction and the complementary direction so that a stretchable guide surface is formed by joining the adjuster guide surface and the complementary guide surface along the joint surfaces to define the continuous and even flat surface.

In this method, when the adjuster member mounted on the end portion of each guide rail is adjusted with respect to its position in the transfer direction, the complementary member is moved in the complementary direction to be inserted into the space made between the guide surface of each guide rail and the adjuster guide surface of the adjuster member. Thus, the stretchable guide surface which is the flat surface continuous and even with the guide surface of the guide rail can be easily formed by means of the complementary guide surface and the adjuster guide surface formed on the complementary member and the adjuster member.

In a ninth aspect of the present invention, there is provided a stretchable guide device for a movable article including a pair of guide rails respectively provided with guide surfaces for guiding both side surfaces of the movable article in a moving direction; an adjuster member mounted on one end of each of the guide rails to be movable in the moving direction of the movable article and provided with an adjuster guide surface which is a flat surface even with the guide surface; and a complementary member insertable into a space which is made between the guide surface of the guide rail and the adjuster guide surface of the adjuster member when the adjuster member is moved in the moving direction, and provided with a complementary guide surface for forming a stretchable guide surface together with the adjuster guide surface.

With this construction, since the layout and the displacement of apparatus can be done with the space from guide rails next thereto or the like being widened by contracting the adjuster member provided on the end of each guide rail, the danger of contact or collision with any adjoining apparatus is minimized, so that it becomes easier to shorten a work time. Then, the space between the adjoining transfer conveyers can be adjusted to several millimeter wide by stretching the adjuster member in the state that the layout of plural apparatus is completed. At this time, when the adjuster member mounted on the end portion of each guide rail is adjusted with respect to its position in the moving direction of the movable article, the complementary member is inserted into the space made between the guide surface of each guide rail and the adjuster guide surface of the adjuster member, whereby the complementary guide surface formed on the complementary member and the adjuster guide surface form the stretchable guide surface which is a flat surface continuous and even with the guide surface, and the movable article can be smoothly guide at each of its both side surfaces along the guide surface and the and the stretchable guide surface. Thus, it is possible to provide the stretchable guide device for the movable article simplified in construction and low in cost.

PREFERRED EMBODIMENTS TO PRACTICE THE INVENTION

Figure 1:
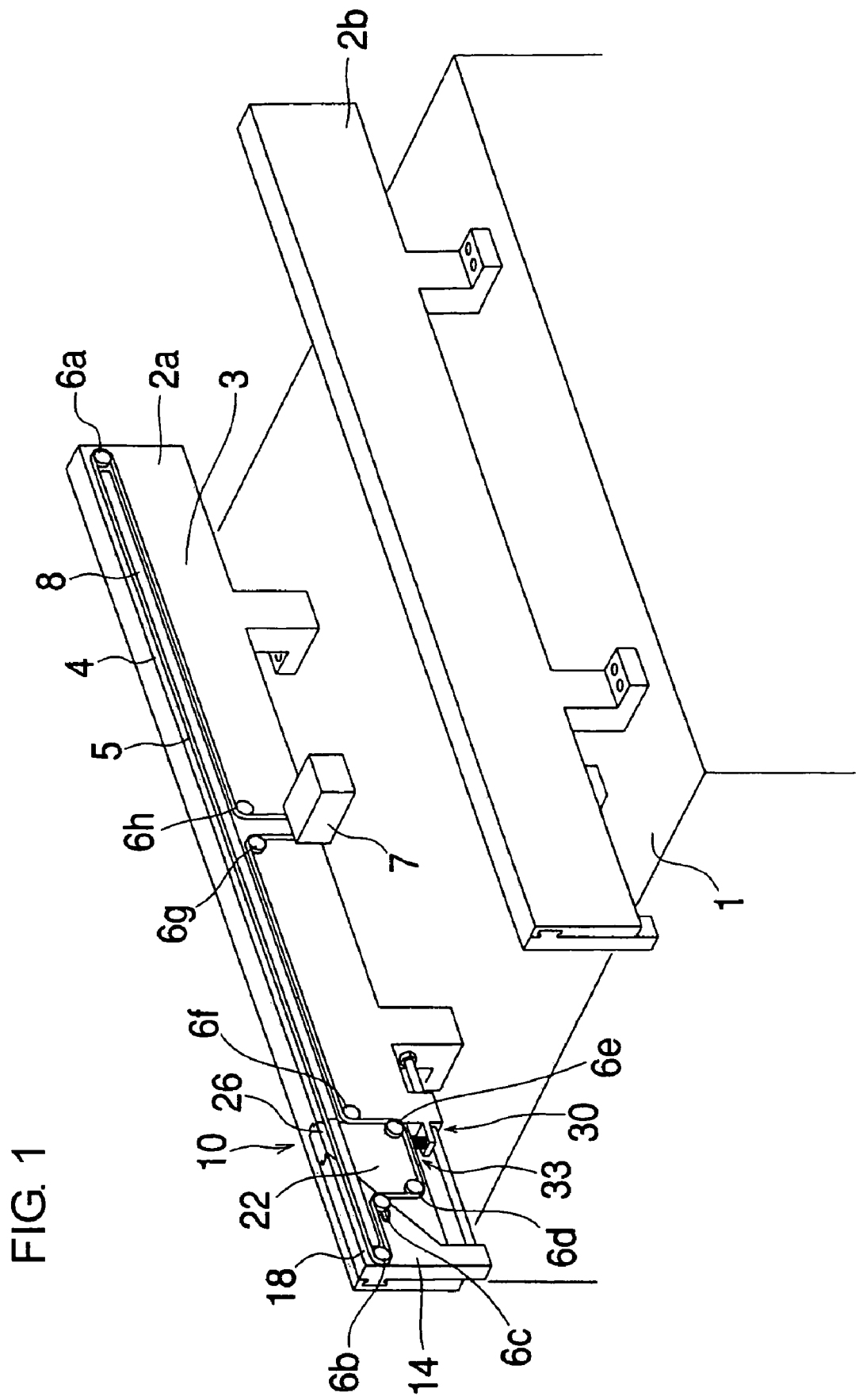
FIG. 1 is a perspective view showing a stretchable transfer conveyer in a first embodiment according to the present invention.
Figure 2:
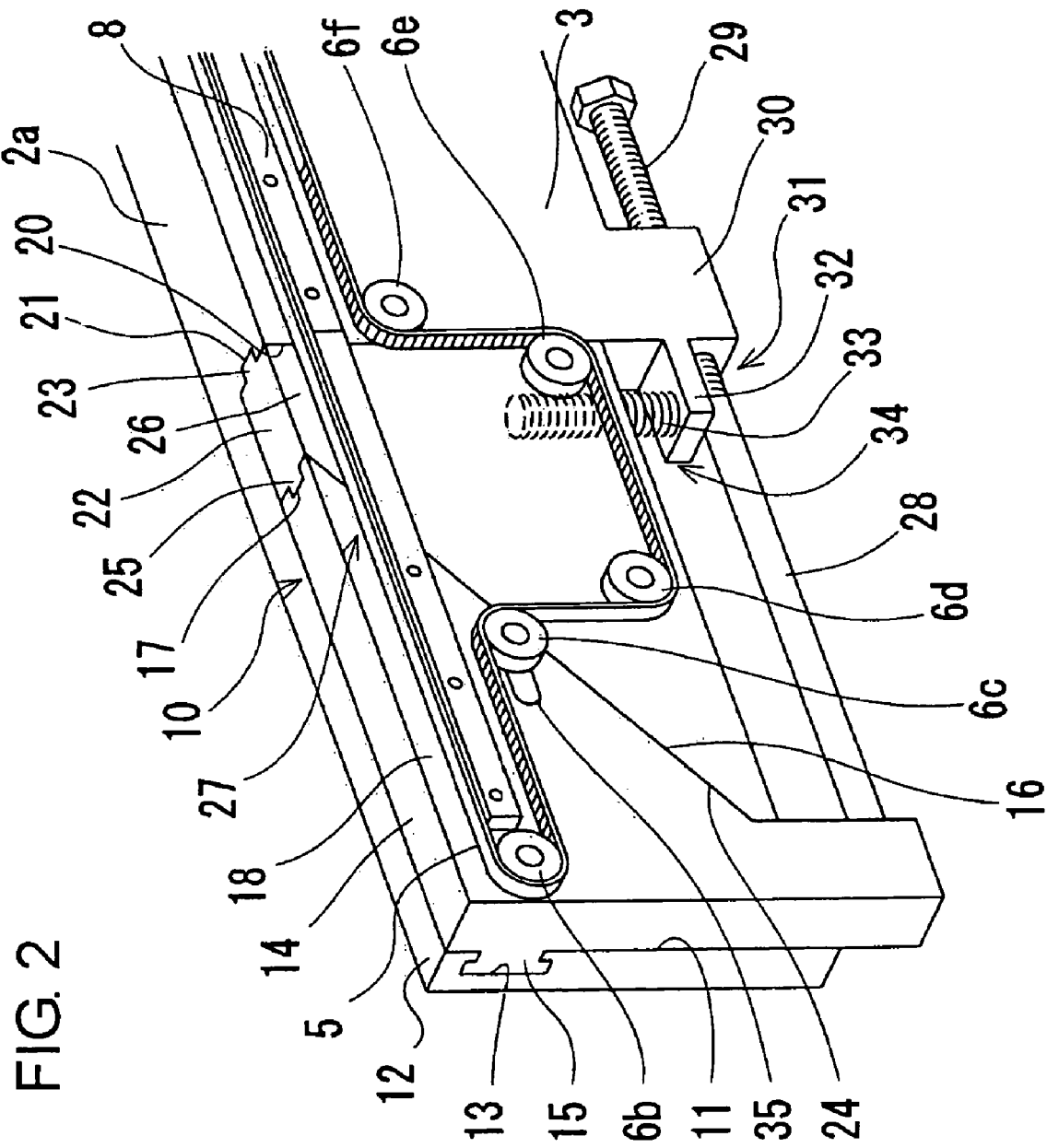
FIG. 2 is an enlarged perspective view showing the environment of a stretching mechanism.

Hereafter, a stretchable transfer conveyer in a first embodiment according to the present invention will be described with reference to the drawings. In FIG. 1, a numeral 1 denotes a base of, e.g., an electronic component mounting apparatus, and a pair of guide rails 2a and 2b are fixed on the base 1 to extend in the transfer direction in which transferred articles are to be transferred. Guide surfaces 4 for guiding both side surfaces of a transferred article such as printed board or the like in the transfer direction are provided respectively at facing surfaces 3 of the guide rails 2a and 2b. At the facing surface 3 of each of the guide rails 2a, 2b, a flexible endless belt such as belt 5, chain or the like for transferring the transferred article in the transfer direction while supporting lower surfaces at both sides of the transferred article is supported to be circulatable by being wound around plural rotational members such as pulleys or the like. Although the guide rails 2a, 2b are arranged to be symmetrical with respect to a plane extending in parallel therebetween, they take the same construction, and therefore, the following description will be made regarding the guide rail 2a only. A motor 7 as drive device is fixed on the facing surface 3, and a toothed pulley secured on an output shaft of the motor 7 is in mesh with grooves formed on the internal surface of the belt 5 thereby to drive the belt 5. As shown in FIG. 2, a horizontally traveling section of the belt 5 which section horizontally travels along the guide surface 4 with its external surface directed upward is moved to make its internal surface slide along a support bar 8 which is horizontally fixed on the facing surface 3 of the guide rail 2a.

Stretching mechanisms 10 are provided at respective one ends of the guide rails 2a, 2b. At the one end of the guide rail 2a, the inside surface 11 recedes outside from the facing surface 3 to form a thin depth portion 12. A T-shape protrusion 15 formed on a back surface of an adjuster member 14 is fit in a T-shape slot 13 horizontally provided on the inside surface 11, so that the adjuster member 14 is mounted on the end portion of the guide rail 2a to be adjustable with respect to its position in the horizontal direction coinciding with the transfer direction. A joint surface 16 inclined 45 degrees relative to the horizontal direction is formed on the adjuster member 14 to face downward, and a slot 17 is formed on the joint surface 16. The adjuster member 14 is provided with an adjuster guide surface 18 which is a flat surface even with the guide surface 4.

A stepped portion 20 at an end of the thin depth portion 12 is formed perpendicularly to the guide surface 4 to extend in the vertical direction, and a slot 21 is formed at the stepped portion 20 to extend in the vertical direction. The slot 21 has fitted therein a protrusion 23 of a complementary member 22, and the complementary member 22 is movable in the vertical direction coinciding with a complementary direction. A joint surface 24 inclined 45 degrees relative to the horizontal direction and the vertical direction is formed on the complementary member 22 to face upward, and a protrusion 25 is protruded from the joint surface 24 to fit in the slot 17. The complementary member 22 is provided with a complementary guide surface 26 which is a flat surface even with the guide surface 4. Thus, when the adjuster member 14 is moved horizontally, the complementary member 22 is moved in the vertical direction by being guided through the fitting engagement of the slot 21 with the protrusion 23 as the adjuster member 14 and the complementary member 22 are guided through the fitting engagement of the slot 17 with the protrusion 25 to keep the contact at the joint surfaces 16 and 24. As a result, the complementary guide surface 26 of the complementary member 22 is inserted into a clearance made between the guide surface 4 of the guide rail 2a and the adjuster guide surface 18 of the adjuster member 14, and the adjuster guide surface 18 and the complementary guide surface 26 are kept joined with each other along the joint line between the joint surfaces 16 and 24, whereby a stretchable guide surface 27 is formed to be a flat surface continuous and even with the guide surface 4.

A feed screw 28 is rotatably carried at its one end on a lower end of the adjuster member 14 without being moved relative to the adjuster member 14 in the axial direction thereof and is screw-engaged at its screw portion 29 with a female screw portion 30 protruded from a lower end of the guide rail 2a. Thus, the feed screw 28, the female screw portion 30 and the like constitute a feed device 31 for moving the adjuster member 14 in the transfer direction. Over the feed screw 28, a spring seat 32 is extended horizontally from the stepped portion 20 of the guide rail 2a, and a compression spring 33 seated on the spring seat 32 is received in a spring receiving hole which is formed upward from a bottom surface of the complementary member 22, thereby to urge the complementary member 22 upward. The compression spring 33, the spring seat 32 and the like constitute a linkage motion means 34 for moving the complementary member 22 in the complementary direction in linkage relation with the movement of the adjuster member 14.

The both ends of the horizontally traveling section of the belt 5 which section travels on the guide surface 4 with its external surface faced upward are wound respectively around a pulley 6a carried on an upper portion on the other side of the guide rail 2a to be rotatable about a horizontal axis and a first pulley 6b mounted on an upper portion on one side of the adjuster member 14. The belt 5 run out horizontally from the first pulley 6b is bent downward by a second pulley 6c mounted on the adjuster member 14, the belt 5 run out from the second pulley 6c is bent horizontally by a third pulley 6d mounted on the complementary member 22, the belt 5 run out from the third pulley 6d is bent vertically by a fourth pulley 6e mounted on the complementary member 22, the belt 5 run out from the fourth pulley 6e is bent horizontally by a fifth pulley 6f mounted on an upper portion adjacent to the stepped portion 20 of the facing surface 3 of the guide rail 2a, and the belt 5 run out from the fifth pulley 6f is wound around the pulley 6a after being caused by pulleys 6g and 6h to be wound around the toothed pulley secured to the output shaft of the motor 7.

Figure 4:
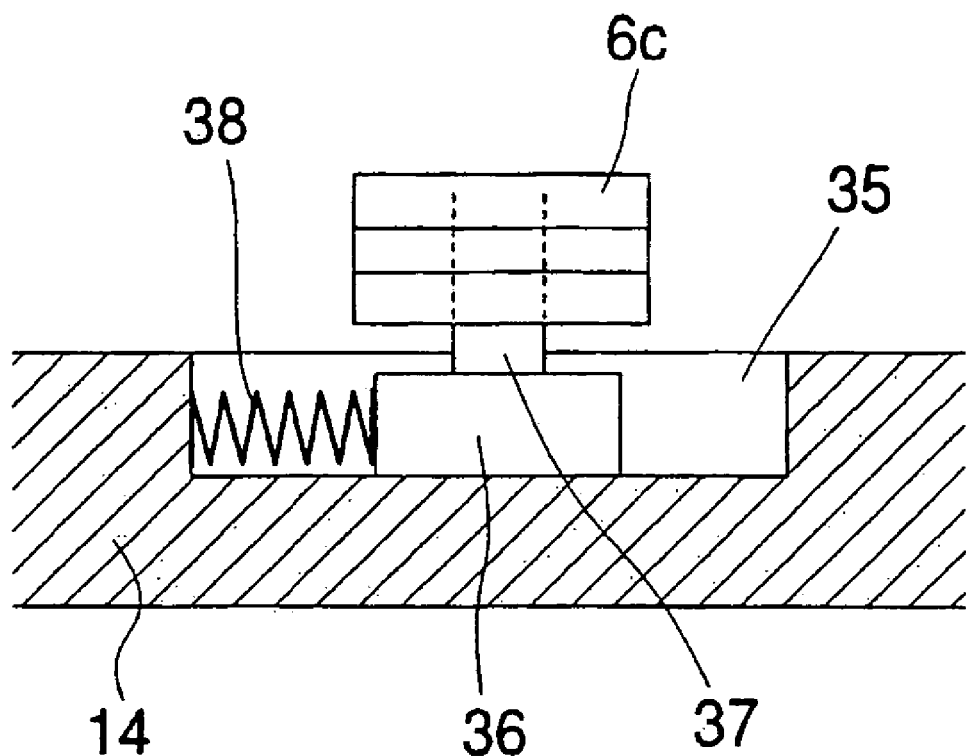
FIG. 4 is a view showing a tension pulley.

When the position of the adjuster member 14 is adjusted in the horizontal direction, the distance through which the belt 5 is wound around the pulleys 6 would otherwise become different from the length of the internal surface of the belt 5. To cancel the difference, as shown in FIG. 4, an elongate groove 35 is formed on the adjuster member 14 to extend in the horizontal direction, the second pulley 6c is rotatably carried on a horizontal shaft 37 which is provided on a slider 36 held slidably in the elongate groove 35, and the slider 36 is urged by a compression spring 38, whereby the second pulley 6c functions as a tension pulley to give a suitable tension to the belt 5 between the first and third pulleys 6b, 6d.

Figure 3:
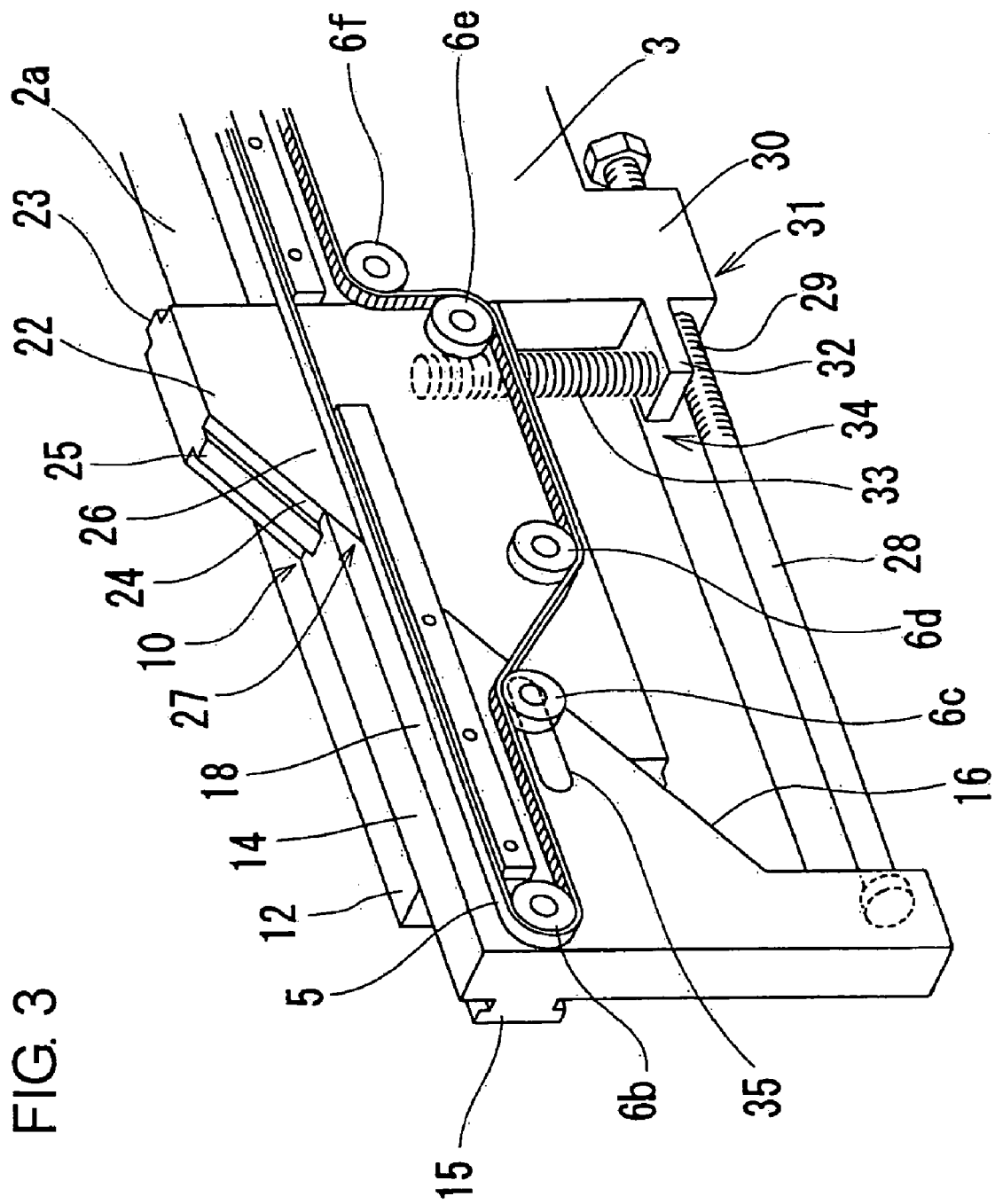
FIG. 3 is a perspective view showing the stretching mechanism in a stretched state.

Next, description will be made regarding the operation of the conveyer in the foregoing first embodiment. Where the facility is newly built up or is changed for new layout, the adjuster members 14 are bought into the state that they are withdrawn relative to the guide rails 2a and 2b, and an apparatus next to the transfer conveyer is displaced and installed with a sufficient space being secured between the end portion of the transfer conveyer and the apparatus next thereto. With the layout of the apparatus fixed, the feed screw 29 is rotated, and position adjustment is performed by pulling out each of the adjuster members 14 horizontally from the ends of the guide rails 2a and 2b through the screw engagement of the screw portion 29 with the female screw portion 30 so that the space from a transfer conveyer next thereto becomes several millimeter long. As each adjuster member 14 is moved horizontally, the complementary member 22 is moved by the resilient force of the compression spring 33 upward in the vertical direction with the contact being kept between the joint surface 16 and the joint surface 24, as shown in FIG. 3. Thus, the complementary guide surface 26 of the complementary member 22 is inserted into the space made between the guide surface 4 of the guide rail 2a and the adjuster guide surface 18 of the adjuster member 14, and the adjuster guide surface 18 and the complementary guide surface 26 are joined along the joint line between the joint surfaces 16 and 24, whereby the stretchable guide surface 27 is formed as the flat surface continuous and even with the guide surface 4. At this time, the change in distance among the pulleys 6 caused by the movement of the adjuster member 14 is cancelled through the movement of the second pulley 6c. When the motor 7 is driven in this state, the belt 5 is circulated while being guided along the pulleys 6, and the transferred article which is mounted on the horizontally traveling section of the belt 5 sliding on the support bar 8 is transferred smoothly by being smoothly guided at its either side surface along the guide surface 4 formed at the facing surface 3 of each guide rail 2a (or 2b) as well as along the stretchable guide surface 27 of the stretching mechanism 10 which is formed as the flat surface even and continuous with the guide surface 4 without forming any stepped portion.

Second Embodiment

Figure 5:
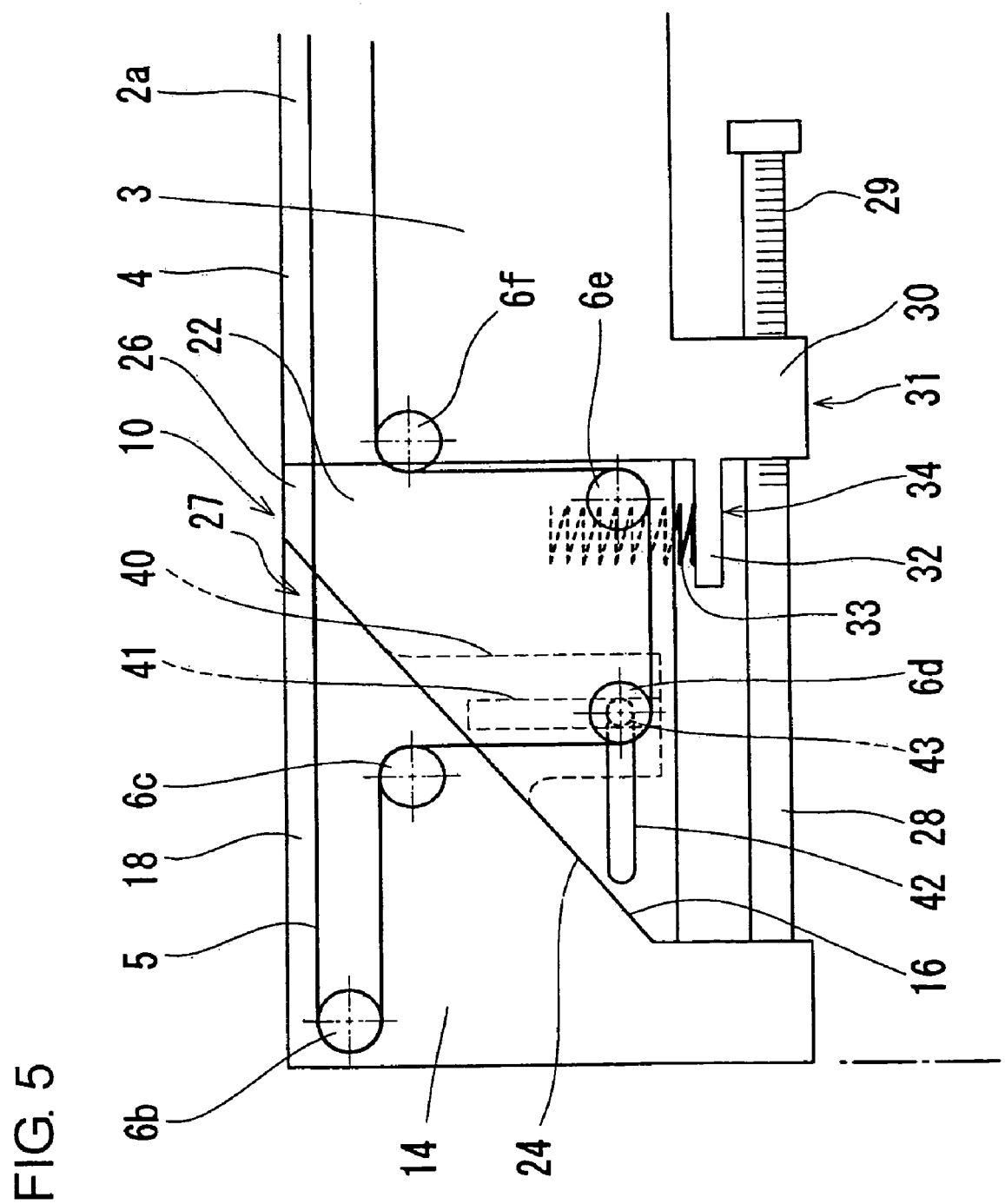
FIG. 5 is a view showing a second embodiment.
Figure 6:
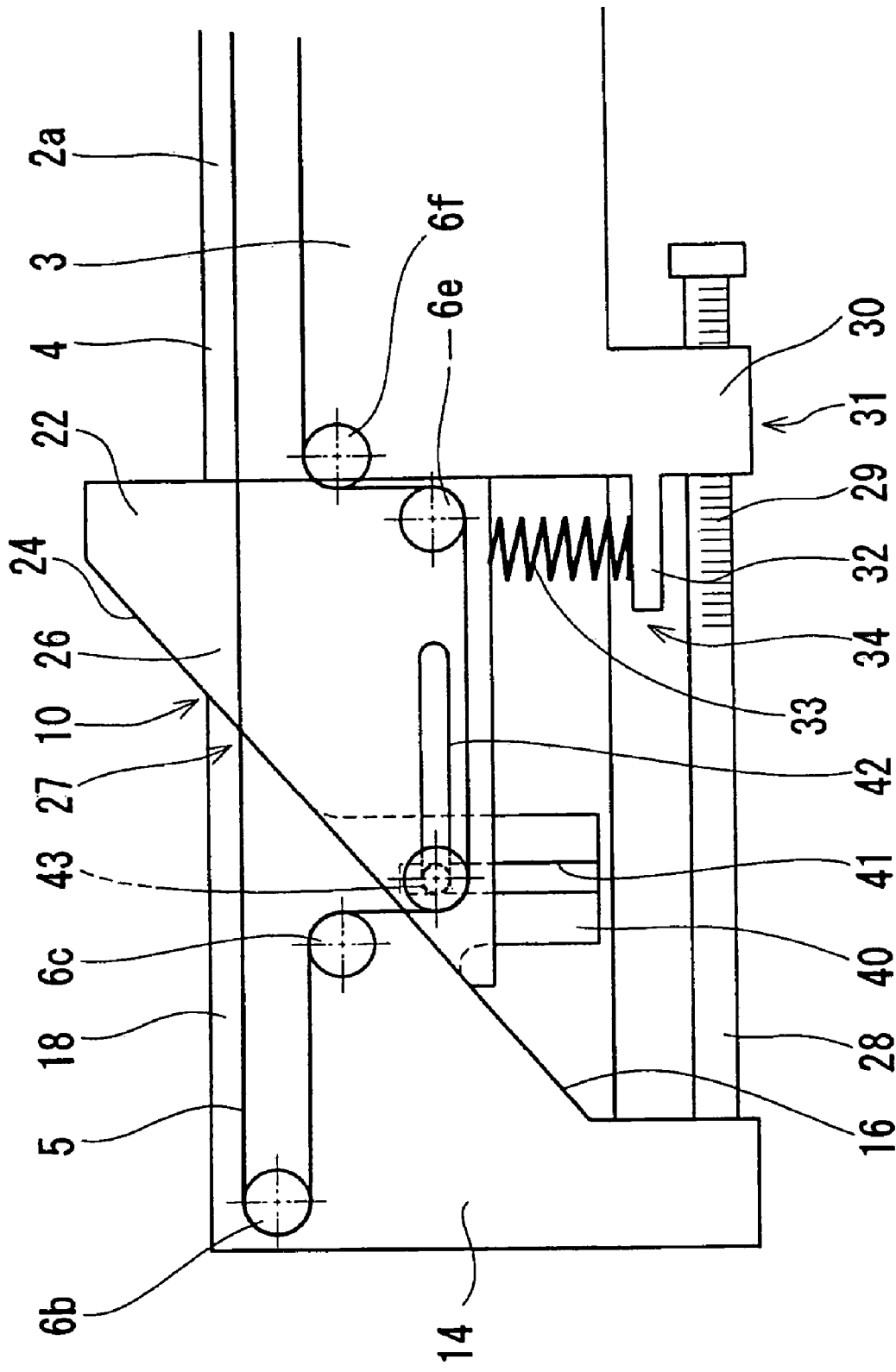
FIG. 6 is a view showing a stretching mechanism in the second embodiment in a stretched state.

Next, description will be made regarding a stretchable transfer conveyer in a second embodiment wherein the third pulley 6d is movable while being restrained to slide along a vertical guide vertically provided on the adjuster member 14 and a horizontal guide horizontally provided on the complementary member 22. Because the conveyer in the second embodiment has the same construction as that in the first embodiment except for a difference only in the manner of supporting the third pulley 6d, the components of the second embodiment which are same as those in the first embodiment are given the same reference numerals as used in the second embodiment and are omitted from description. As shown in FIGS. 5 and 6, the adjuster member 14 is provided with a hanging portion 40 which extends downward at a position close to the second pulley 6c, and a guide slot 41 is vertically formed on the hanging portion 40. An elongate guide hole 42 is formed on the complementary member 22 to extend horizontally on the same position in the vertical direction as the fourth pulley 6*e*. A slider which protrudes a horizontal shaft 43 rotatably carrying the third pulley 6*d* is slidably fit in the guide slot 41 and the elongate guide hole 42. Thus, regardless of any adjusted position of the adjuster member 14 in the horizontal position, the belt 5 run out horizontally from the first pulley 6*b* is bent perpendicularly by the second pulley 6*c* mounted on the adjuster member 14 to run downward, and the belt 5 run out perpendicularly from the second pulley 6*c* is bent by the third pulley 6*d* to run horizontally. Since the joint surfaces 16 and 24 are inclined 45 degrees relative to the horizontal direction as well as to the vertical direction, the complementary member 22 is vertically moved by the same distance as the moving distance in the horizontal direction of the adjuster member 14. At this time, the change of the belt winding distance (L) which corresponds to twice as long as the moving distance in the horizontal direction of the adjuster member 14 is cancelled by the change of the belt winding distance which corresponds to twice as long as the same moving distance in the vertical direction of the complementary member 22, so that the winding distance around the pulleys 6 does not vary regardless of any adjusted position of the adjuster member 14.

In the foregoing embodiments, the complementary direction is the vertical direction, and the joint surfaces of the adjuster member and the complementary member are inclined 45 degrees relative to the transfer direction as well as to the complementary direction. However, the present invention is not limited to this construction. In an alternative form, there may be taken any other arrangement so far as the complementary direction is set to across the transfer direction and so far as the joint surfaces are inclined relative to the transfer direction as well as to the complementary direction.

INDUSTRIAL APPLICABILITY

The stretchable transfer conveyer and the method of stretching the transfer conveyer according to the present invention is suitable for use as a transfer conveyer for transferring printed boards to position the same at a mounting position in an electronic component mounting apparatus wherein a component pickup head provided on a component mounting device takes electronic components from a takeout portion of a component supply device to mount the electronic components on the printed boards successively positioned to a target position.

The invention claimed is:

1. A stretchable transfer conveyer for a transferred article comprising a board, wherein a pair of guide rails respectively provided with guide surfaces for guiding both side surfaces of the transferred article in a transfer direction are extended in the transfer direction and wherein flexible endless belts for supporting lower surfaces at both sides of the transferred article, both side surfaces of which are guided along the guide surfaces, to transfer the transferred article in the transfer direction, are drivingly connected to a drive device and are carried along plural rotational members to be circulated, the conveyer comprising:
   a stretching mechanism provided at one end of each of the guide rails to be stretchable in the transfer direction;
   a stretchable guide surface provided at a facing surface of the stretching mechanism and formed into a flat surface continuous and even with the guide surface regardless of the stretched position of the stretching mechanism; and
   plural rotational members provided on the facing surface of the stretching mechanism for circulatably supporting the endless belt, wherein the stretching mechanism comprises:
   an adjuster member mounted on an end of each guide rail to be movable in the transfer direction and provided with an adjuster guide surface being a flat surface even with the guide surface, and a complementary member inserted into a space which is made between the guide surface of the guide rail and the adjuster guide surface of the adjuster member when the adjuster member is moved in the transfer direction, and provided with a complementary guide surface for forming the stretchable guide surface together with the adjuster guide surface, and wherein the complementary member is mounted on the end of the guide rail to be movable in a complementary direction intersecting with the transfer direction with the complementary guide surface defining a flat surface continuous and even with the guide surface, and the adjuster member and the complementary member are joined at respective joint surfaces which are inclined relative to the transfer direction as well as to the complementary direction,
   whereby the adjuster guide surface and the complementary guide surface are jointed at the respective joint surfaces to define the stretchable guide surface as a continuous and even flat surface.

2. The stretchable transfer conveyer as set forth in claim 1, wherein:
   the adjuster member has mounted thereon a first rotational member for winding therearound one end of a horizontally traveling portion of the endless belt and a second rotational member for downwardly bending the endless belt run out from the first rotational member;
   the complementary member has mounted thereon a third rotational member for horizontally bending the endless belt run out from the second rotational member and a fourth rotational member for roughly vertically bending the endless belt bent horizontally; and
   the guide rail has mounted thereon a fifth rotational member for horizontally bending the endless belt run out from the fourth rotational member.

3. The stretchable transfer conveyer as set forth in claim 2, wherein:
   the complementary direction is a vertical direction perpendicular to the transfer direction;
   the adjuster member and the complementary member are joined at the joint surfaces which are inclined 45 degrees relative to the transfer direction;
   the adjuster guide surface and the complementary guide surface are joined along the joint surfaces to constitute the stretchable guide surface;
   the adjuster member has mounted thereon the first rotational member for winding therearound one end of the horizontally traveling portion of the endless belt and the second rotational member for downwardly bending the endless belt run out horizontally from the first rotational member;
   the complementary member has mounted thereon the third rotational member for horizontally bending the endless belt run out from the second rotational member and the fourth rotational member for roughly vertically bending the endless belt bent horizontally;
   the guide rail has mounted thereon the fifth rotational member for horizontally bending the endless belt run out from the fourth rotational member; and
   the third rotational member is moved as being restrained by a guide vertically provided on the adjuster member and another guide horizontally provided on the complementary member.

4. The stretchable transfer conveyer as set forth in claim 1, further comprising:
- a feed device for moving the adjuster member in the transfer direction; and
- means for moving the complementary member in the complementary direction in linkage relation with the movement of the adjuster member.

5. A method of stretching a transfer conveyer for a transferred article comprising a board, wherein a pair of guide rails respectively provided with guide surfaces for guiding both side surfaces of the transferred article in a transfer direction are extended in the transfer direction and wherein flexible endless belts for supporting lower surfaces at both sides of the transferred article, both side surfaces of which are guided along the guide surfaces, to transfer the transferred article in the transfer direction, are drivingly connected to a drive device and are carried along plural rotational members to be recirculated, the method comprising:
- mounting an adjuster member, which is provided with an adjuster guide surface being a flat surface even with the guide surface, on one end of each guide rail to be movable in the transfer direction;
- providing a complementary member, which is provided with a complementary guide surface being a flat surface even with the guide surface, to be movable in the complementary direction intersecting with the transfer direction, with the guide surface and the complementary guide surface defining a continuous and even flat surface;
- joining the adjuster member and the complementary member at respective joint surfaces which are inclined relative to the transfer direction and the complementary direction so that a stretchable guide surface is formed by joining the adjuster guide surface and the complementary guide surface along the joint surfaces to define the continuous and even flat surface; and
- moving the complementary member in the vertical direction when the adjuster member is horizontally moved in the transfer direction.

6. A stretchable guide device for a movable article comprising a board, comprising:
- a pair of guide rails respectively provided with guide surfaces for guiding both side surfaces of the movable article in a moving direction;
- an adjuster member mounted on one end of each of the guide rails to be movable in the moving direction of the movable article and provided with an adjuster guide surface which is a flat surface even with the guide surface;
- a complementary member inserted into a space which is made between the guide surface of the guide rail and the adjuster guide surface of the adjuster member when the adjuster member is moved in the moving direction, and provided with a complementary guide surface for forming a stretchable guide surface together with the adjuster guide surface; and
- a mechanism for moving the complementary member in the vertical direction when the adjuster member is horizontally moved in the transfer direction.

7. The stretchable transfer conveyer as set forth in claim 6, further comprising:
- flexible endless belts for supporting lower surfaces at both sides of the movable article, wherein the adjuster member and the complementary member are joined at the joint surfaces which are inclined by 45 degrees relative to the transfer direction, and the complementary member rotatably supports at least two rotational members for bending a returning part of the flexible endless belt in a U-shape,
- whereby when the adjuster member is adjusted a given distance horizontally in the transfer direction, the complementary member is moved by the moving mechanism by the same distance to automatically maintain the tension of the flexible endless belts unchanged.

* * * * *

UNITED STATES PATENT AND TRADEMARK OFFICE
CERTIFICATE OF CORRECTION

PATENT NO.        : 7,438,176 B2
APPLICATION NO. : 10/552576
DATED             : October 21, 2008
INVENTOR(S)       : Furuuchi It is certified that error appears in the above-identified patent and that said Letters Patent is hereby corrected as shown below:

On the title page, Item (54) and Column 1, the title information is incorrect. Item (54) and Column 1 should read:

-- (54)  STRETCHABLE TRANSFER CONVEYOR, METHOD OF STRETCHING TRANSFER CONVEYOR, AND STRETCHABLE GUIDE DEVICE FOR MOVEABLE ARTICLE --

Signed and Sealed this

Thirtieth Day of December, 2008

JON W. DUDAS
*Director of the United States Patent and Trademark Office*